United States Patent
Munir et al.

(10) Patent No.: US 7,359,990 B2
(45) Date of Patent: Apr. 15, 2008

(54) EDITING FILES OF REMOTE SYSTEMS USING AN INTEGRATED DEVELOPMENT ENVIRONMENT

(75) Inventors: Kushal Sayeed Munir, Toronto (CA); Donald J. Yantzi, Toronto (CA); Phil Coulthard, Aurora (CA)

(73) Assignee: International Business Machines Corporation, Armonk, NY (US)

( * ) Notice: Subject to any disclaimer, the term of this patent is extended or adjusted under 35 U.S.C. 154(b) by 897 days.

(21) Appl. No.: 10/285,996

(22) Filed: Oct. 31, 2002

(65) Prior Publication Data

US 2004/0003119 A1 Jan. 1, 2004

(30) Foreign Application Priority Data

Jun. 26, 2002 (CA) .................................. 2391719

(51) Int. Cl.
G06F 15/16 (2006.01)
(52) U.S. Cl. ........................................ 709/246; 709/245
(58) Field of Classification Search ................ 709/217, 709/218, 219, 246
See application file for complete search history.

(56) References Cited

U.S. PATENT DOCUMENTS

| | | | |
|---|---|---|---|
| 5,732,219 A | | 3/1998 | Blumer et al. |
| 5,884,078 A | * | 3/1999 | Faustini ..................... 719/315 |
| 5,913,063 A | * | 6/1999 | McGurrin et al. .......... 717/109 |
| 5,913,065 A | * | 6/1999 | Faustini ..................... 717/107 |
| 6,041,179 A | | 3/2000 | Bacon et al. |
| 6,044,398 A | | 3/2000 | Marullo et al. |
| 6,085,034 A | | 7/2000 | Danforth |
| 6,085,228 A | * | 7/2000 | Tharakan ................... 709/203 |
| 6,139,198 A | | 10/2000 | Danforth et al. |
| 6,141,792 A | | 10/2000 | Acker et al. |
| 6,151,609 A | * | 11/2000 | Truong ....................... 715/505 |
| 6,158,044 A | | 12/2000 | Tibbetts |
| 6,195,794 B1 | * | 2/2001 | Buxton ....................... 717/108 |

(Continued)

OTHER PUBLICATIONS

Toggleable Widge For A User Interface, Phil Coulthard et al., File Date Oct. 31, 2002, U.S. Appl. No. 10/285,996.

(Continued)

Primary Examiner—Jason D Cardone
Assistant Examiner—Mitra Kianersi
(74) Attorney, Agent, or Firm—Justin Dillon; Streets & Steele; Jeffrey L. Streets

(57) ABSTRACT

The capability to transfer files to and edit files in an integrated development environment is disclosed. The source files may be located on a remote computer system across a network, such as the Internet. The local system upon which the integrated development environment is executing and the remote system having the source files may have different operating systems, different geographical locations with different human languages, and/or different programming languages. The disclosure herein requests the source file on the remote system and then encodes the differences between the languages and/or the operating system by reading the extension of the source file. These encoded differences are translated when the remote file is opened in the local integrated development environment with an editor. The editor may be a LPEX editor if the files are members of an OS/400 operating system, or the editor may be an operating system editor for a file having the source file's extension, or a default text editor. The edited file is encoded for use on the remote system and then transferred to the remote system.

31 Claims, 13 Drawing Sheets

U.S. PATENT DOCUMENTS 6,792,595 B1 * 9/2004 Storistenau et al. ........ 717/110
6,961,726 B1 * 11/2005 Eisenberg et al. ............ 707/10
7,003,798 B2 * 2/2006 Yamakawa et al. ........... 726/11

OTHER PUBLICATIONS

Transferring Data and Storing Metadata Across A Network, Phil Coulthard et.al., File Date Oct. 31, 2002, U.S. Appl. No. 10/286,560.

Dynamic Generic Framework for Distributed Tooling, Dave McKnight, File Date Apr. 29, 2002, U.S. Appl. No. 10/134,190.

Framework To Access A Remote System From An Integrated Development, Phil, Coulthard et al., Filed Date Oct. 31, 2002, U.S. Appl. No. 10/286,559.

Accessing A Remote Iseries or AS/400 Computer System From An Integrated Development Environment, Phil Coulthard et al., File Date Oct. 31, 2002, U.S. Appl. No. 10/285,993.

* cited by examiner

EDITING FILES OF REMOTE SYSTEMS USING AN INTEGRATED DEVELOPMENT ENVIRONMENT

RELATED APPLICATIONS

This application is related to Ser. No. 10/134,190 entitled Dynamic Generic Framework for Distributed Tooling filed Oct. 31, 2001, Ser. No. 10/286,583 entitled Toggleable Widget for a User Interface filed May 29, 2002, Ser. No. 10/286,560 entitled Transferring Data and Storing Metadata Across a Network, and Ser. No. 10/286,559 entitled Framework to Access a Remote System from an Integrated Development Environment, Ser. No. 10/285,993 entitled Accessing a Remote iSeries Computer System From an Integrated Development Environment, which are hereby incorporated by reference is their entireties.

TECHNICAL FIELD

This invention relates generally to the field of the development of computer applications, and more particularly, relates to a method to access and edit remote iSeries systems from an integrated development environment (IDE).

BACKGROUND OF THE INVENTION

Modem software development has its own terminology and, herein at the beginning, a tutorial in definitions as used herein may be helpful. An application is a software program used by an end user; examples of applications include a scheduling client program or application wherein a person may schedule employees' work days; a word processing application; a presentation application to prepare slides for a talk; a database application in which to manipulate data; a spreadsheet application, etc. A tool is a software application that enables a software developer to write additional applications. Examples of tools include: a remote-accessing tool; a database tool to access and manipulate remote relational database tables, columns and rows; a message queue tool to access and manipulate remote message queues; an import tool to select files on a remote system for importing into an ongoing software development project; a performance tool to access and configure remote performance; a tracing tool to trace execution of remote performance, a file tool to access folders and files in the file system of a remote system, etc. A component is software code that can be reused across multiple applications; in other words, a component is standard software that can be pulled off a server and incorporated into new applications using a tool by software developers. For example, a calendar component may be used in several applications such as a scheduling application, a presentation application, a data base application to calculate employee's vacation and pay, etc. Thus, a software developer uses tools to pull components from a local or remote server to create applications.

Software developers found it was first convenient and then necessary to have all code generation tools under one umbrella, called an integrated development environment (IDE). Integrated development environments, as the name suggests, give the software engineer an environment wherein the appropriate tools needed for source code editing, compiling, linking, testing, debugging, and profiling are seamlessly integrated. The advantage of using an integrated development environment is that the software developer need not be concerned about the tool interfaces when moving from one phase of code development to the other. Typically the integrated development environments track the phase of code generation and take appropriate actions of invoking the necessary tool.

Examples of a software development, analysis, and maintenance environments have been known for over twenty years, one of the first was Genera by Symbolics and LISP. For Unix programmers, FUSE is an integrated development environment that has tools that include editors, program builders, source code managers, debuggers, cross-referencers, call graph browsers, file comparison tools, main page hypertext viewers, search tools, performance profilers, heap analyzers, program visualizers, and an optional C++ class browser. Other examples are IBM's VisualAge products, VisualAge C++ and VisualAge for Java. VisualAge C++ provides an environment and toolset for multiplatform object oriented application development with class libraries and frameworks to build applications on AIX. VisualAge for Java is IBM's Java development environment to build Web-enabled enterprise applications with support for building and testing Java applets, servlets, and Enterprise JavaBeans. There are many other integrated development environments, but basically integrated development environments provide a complete capability for building, editing, compiling, dynamically and statically analyzing programs, configuring, source browsing, and debugging, etc.

Because there was a serious need in the industry for an open source integrated development environment that supported C and C++ in addition to Java, IBM and RedHat developed an integrated development environment called Eclipse to develop software in a myriad of computer languages. Eclipse runs not only on Linux but also other operating systems. There is some special interest in Linux because it is an open source operating system, meaning that it does not belong to a single one company, but is owned and developed by the public. The Eclipse integrated development environment is thus an open source environment for creating, integrating and deploying application development tools across a broad range of computing technology. Eclipse provides a common set of services and establishes the framework, infrastructure, and interactive workbench to build application software and related elements. Eclipse includes, inter alia, a source code editor with code browsing and navigation features like code assist, syntax based color highlighting and integrated help facilities that uses a graphical user interface.

Eclipse.org is an open consortium of software development tool vendors that collaborate to create development environments and product integration and share an interest in creating easy-to-use and interoperable products based upon plug-in technology. By collaborating and sharing core integration technology, tool vendors can concentrate on their areas of expertise and the creation of new development technology. Eclipse.org now includes members and founding steward companies: Borland, IBM, MERANT, QNX Software Systems, Rational Software, RedHat, SuSE, TogetherSoft and WebGain.

Although the Eclipse platform has built-in functionality, most of that functionality is very generic. Additional tools are necessary to extend the platform to work with new content types, to do new things with existing content types, and to focus the generic functionality on something specific. FIG. 1 is a simplified block diagram of the Eclipse integrated development environment. Eclipse is built on a mechanism for discovering, integrating, and running modules called plug-ins. The plug-in mechanism is used to partition Eclipse itself. Indeed, separate plug-ins provide the workspace, the workbench, and so on. When Eclipse is launched, the software developer is presented with an integrated development environment composed of the set of available plug-ins. Even the Eclipse platform runtime itself has its own plug-in. Because any plug-in is free to define new extension points and to provide new application program interfaces (APIs) for other plug-ins to use, a plug-in's extension points can be extended by other plug-ins. An extension point may declare additional specialized XML element types for use in the extensions. On start up, the Platform Runtime discovers the set of available plug-ins, reads their XML manifest files, and builds an in-memory plug-in registry. Eclipse matches extension declarations by name with their corresponding extension point declarations. The resulting plug-in registry is available via the Platform application program interface. A tool provider writes a tool as a separate plug-in that operates on files in the workspace and surfaces its tool-specific user interface in the workbench. The Eclipse Platform user interface is built around a workbench that provides the overall structure and presents an extensible user interface to the user. The workbench application program interface and implementation are built from two toolkits: the Standard Widget Toolkit (SWT) which is a widget set and graphics library integrated with the native window system but is independent of the operating system; and J Face which is a user interface toolkit that simplifies common user interface programming tasks. The entire Eclipse Platform user interface and the tools that plug into it use SWT for presenting information to the user. The team support component of Eclipse adds version and configuration management (VCM) capabilities to projects in the workspace and augments the workbench with views for presenting version and management concerns to the user. And, last but not least, there is the ubiquitous Help. The Eclipse Help mechanism allows tools to define and contribute documentation to one or more online books. For example, a tool usually contributes help style documentation in a user guide, and API documentation, if any, in a separate programmer guide. Eclipse thus takes care of all aspects of workbench window and perspective management. Editors and views are automatically instantiated as needed, and disposed of when no longer needed. The display labels and icons for actions contributed by a tool are listed in the plug-in manifest so that the workbench can create menus and tool bars without activating the contributing plug-ins.

There is a need within Eclipse and other integrated development environments to be able to access remote resources on an iSeries, Linux, Windows, and/or a Unix machine. A typical IDE such as Eclipse, moreover, provides support for editing and syntax highlighting of different programming languages for the user. For programmers, moreover, who develop programs for remote servers, there is a need to be able to edit files that may not exist locally on their machine. In a client/server environment, software developers need to edit source code in real-time wherein that code very often resides on remote machines. In other words, software developers want to open, edit, and save remote files as if those files existed on their local machine, without having to manually transfer files between their workstation and the server. There is an additional a need to provide remote edit support to files from many different platforms such as iSeries, Linux, Windows and Unix, and across different human languages and locations such as English, Chinese, Japanese, etc.

SUMMARY OF THE INVENTION

These needs and others are satisfied by a method to open a computer source file located on a remote computer, comprising the steps of: selecting a source file to open; examining an extension of the source file; determining a file transfer mode of the source file from the extension; sending a request to retrieve the source file; determining if the source file is binary; if so, transferring the binary source file to a receiving computer; and opening the binary source file. If the source file is a text file, however, then the method encodes the source file to be interpretable by the receiving computer and sends the encoded source file to the receiving computer; and opens the encoded source file. Encoding may be accomplished by reading and interpreting the CCSID character of the source file. In any case, the transferred file, whether binary or text, may be edited with a LPEX editor if the file is a member in an iSeries native file system, or a default text editor which may or may not be provided by an integrated development environment, and/or with an operating system editor associated with the extension of the source file.

The edited source file is saved to a temporary file within the integrated development environment, and the file transfer mode is determined. The temporary file is read and if the transfer mode is binary, the edited binary source file is transferred to the remote computer. If the file transfer mode is text, the temporary file is encoded for the remote computer, and transferred. The temporary file is deleted on the integrated development environment. Additional encoding may account for differences in the operating system on the remote computer and the operating system on the receiving computer; also for differences in computer languages between the source file on the remote computer and the encoded file on the receiving computer.

The invention may also be considered a method for editing a source file from a remote operating system with a receiving operating system, comprising the steps of: selecting a source file to open; examining an extension of the source file; determining a file transfer mode of the source file from the extension; sending a request to retrieve the source file; determining if the source file is binary and if so, transferring and opening the binary source file to a receiving computer; if not binary, then determining if the source file is text and if text, then encoding the source file to be interpretable by the receiving computer by, e.g., determining a CCSID character of the text source file and including the CCSID character in the step of encoding the source file; sending an encoded source file to the receiving computer; and opening the encoded source file. The method further includes a step of creating a edited temporary file by editing the binary source file or the encoded source file with at least one of the following editors: a LPEX editor, and/or a default text editor provided by an integrated development environment, and/or an operating system editor associated with the extension of the source file; and then saving the edited temporary file; determining the file transfer mode of the edited temporary file; reading the edited temporary file; and if the transfer mode is binary, transferring the edited temporary file to the remote computer, but if the transfer mode is text then encoding the edited temporary text file to encoding of the remote computer and then transferring the edited temporary file to the remote computer, and deleting the edited temporary file on the receiving computer.

The invention is also an apparatus, a computer processing device, comprising: a processor; a memory functionally connected to the processor, the memory having an operating system executing on the processor; a network interface by which the processor can access one or more remote systems across a connected or wireless network; an integrated development environment executing on the processor; an encoder by which to determine if a source file on the one or more remote systems is a binary or a text file and if a text file to encode the differences between the one or more remote systems and the operating system; a datastore technology by which to transfer the source file from the one or more remote systems to the operating system; and an editor by which to edit the source file on the operating system. The encoder encodes the differences between the operating system of the remote system and the operating system. The encoder may also encode the differences between human languages on remote system so that the source file is translated for the editor on the operating system and/or the differences between computer programming languages on remote system so that the source file is translated for the editor on the operating system. The operating system of the remote system may be an OS/400; the integrated development environment may be Eclipse.

The invention is also a tangible article of manufacture embodying a program of machine readable instructions executable by an electronic processing apparatus to perform method steps for operating an electronic processing apparatus, said method steps comprising the steps of: requesting a source file on a remote system; determining whether the source file is a binary or a text file; encoding the text file for use on a local integrated development environment; editing the source file within the local integrated development environment, whether it be a binary or a text file; and encoding the edited text file for transfer to the remote system. The article of manufacture may further include instructions to transfer the source file to the local integrated development environment and then transfer the edited source file to the remote system.

The invention is also a file retrieval and editing system, comprising: means to determine if a source file is a text or a binary file, the source file located on a remote computer system across a network; means to encode a difference between the source file and a temporary file, the temporary file to be opened in a the file retrieval and editing system; means to open the temporary file in the file retrieval and editing system; means to edit the temporary file; means to store the edited temporary file in the file retrieval and editing system; means to encode the edited temporary file for use on the remote computer system; and means to transfer the encoded and edited temporary file to the remote computer system.

BRIEF DESCRIPTION OF THE DRAWING

Additional features and advantages of the invention will further be described below with regard to the Drawing, wherein.

DETAILED DESCRIPTION OF THE INVENTION

Figure 1:
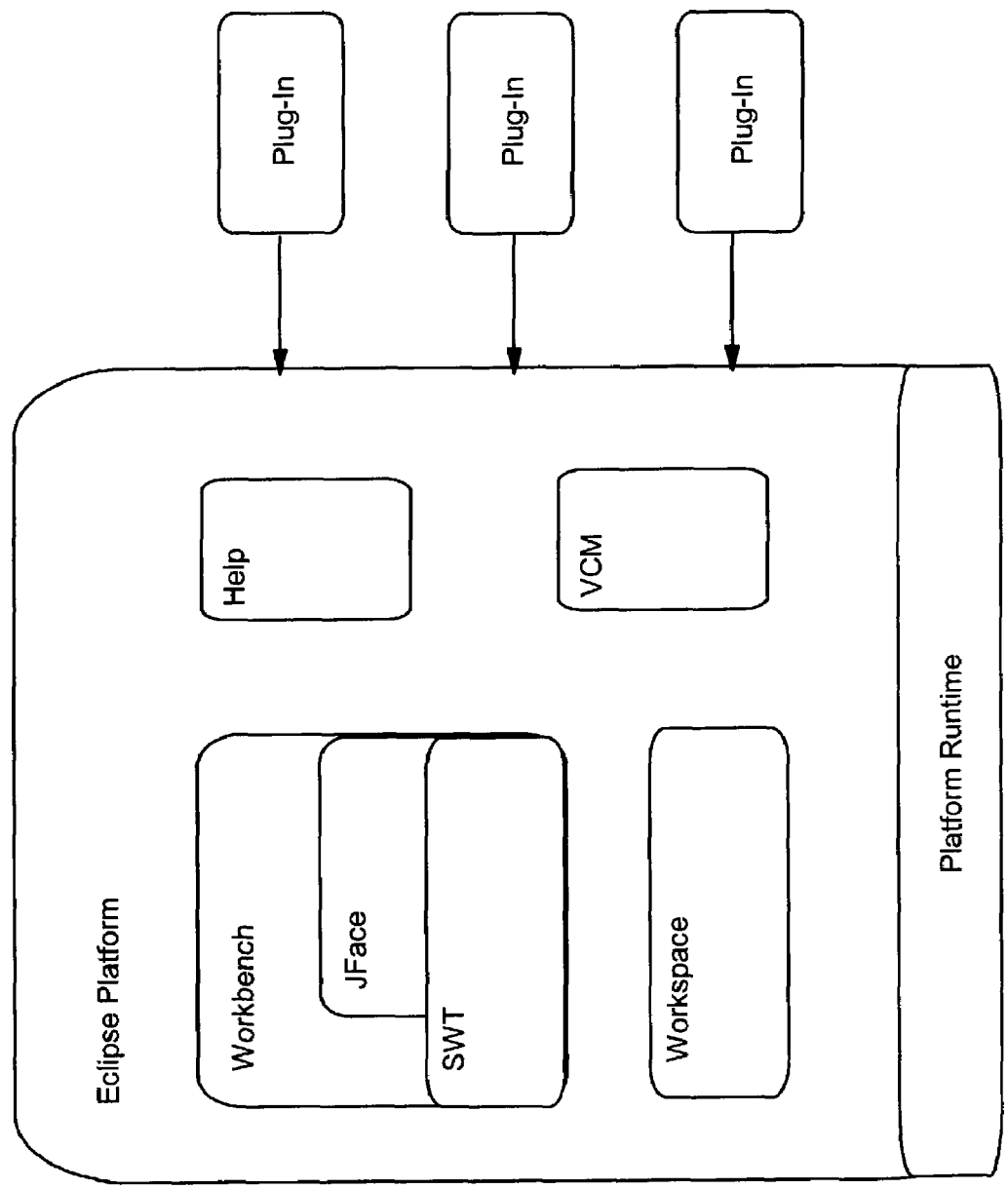
FIG. 1 is a simplified block diagram of the prior art Eclipse integrated development environment.
Figure 2:
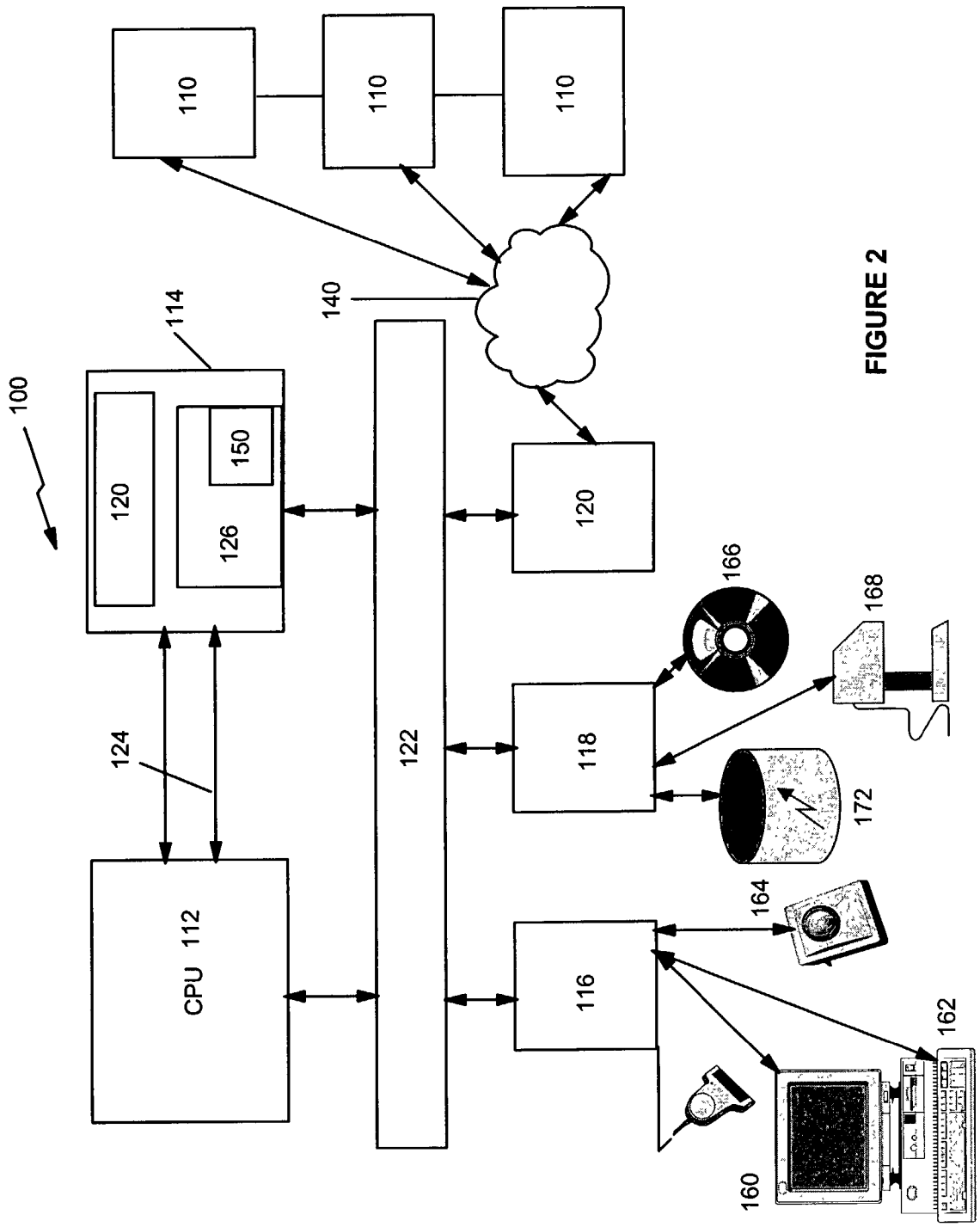
FIG. 2 is a simplified representation of a computer network in which an integrated development environment may function.

Referring to the Drawing, wherein like numbers denote like parts throughout the several views, FIG. 2 shows a high-level block diagram of a computer network system 100, consistent with an embodiment of the invention. Computer network system 100 may comprise any number of networked computers 110, each of which may have a central processing unit (CPU) 112, main memory 114, terminal interface 116, data storage interface 118, and a network interface 120. The various devices communicate with each other via internal communications bus 122. CPU 112 is a general-purpose programmable processor, executing instructions stored in memory 114; while a single CPU is shown in FIG. 2, it should be understood that computer systems having multiple CPUs could be used. Communications bus 122 supports transfer of data, commands and other information between different devices, and while shown in simplified form as a single bus, it is typically structured as multiple buses; and may be arranged in a hierarchical form, including an internal bus 124 which may connect the CPU 112 with memory 114.

Memory 114 is a random-access semiconductor memory for storing data and programs; memory 114 is shown conceptually as a single monolithic entity but it is well known that memory is often arranged in a hierarchy of caches and other memory devices, some or all of which may be integrated into the same semiconductor substrate as the CPU 112. Random access memory (RAM) devices may comprise the main storage of computer, as well as any supplemental levels of memory, e.g., cache memories, nonvolatile or backup memories, programmable or flash memories, read-only memories, etc. In addition, memory 114 may be considered to include memory storage physically located elsewhere in computer, e.g., a cache memory in a processor or other storage capacity used as a virtual memory, e.g., as stored on a mass storage device or on another computer coupled to computer via network.

Operating system 120 and applications 126 reside in memory 114. Operating system 120 provides, inter alia, functions such as device interfaces, management of memory pages, management of multiple tasks, etc. as is known in the art. Examples of such operating systems may include Linux, AIX, Unix, Windows-based, OS/400, etc. On iSeries and AS/400 machines, OS/400 is the native operating system and file system, and IFS is the Unix file system complemented by the Qshell Unix command shell. The operating system on the iSeries and the AS/400 is the OS/400 which henceforth shall be referred to as the native operating system. These and other various applications, components, programs, objects, modules, etc. may also execute on one or more processors in another computer coupled to computer 110 via a network 140, e.g., in a distributed or client-server computing environment, whereby the processing required to implement the functions of a computer program may be allocated to multiple computers 110 over a network 140. In general, the routines executed to implement the embodiments of the invention, whether implemented as part of an operating system or a specific application, component, program, object, module or sequence of instructions will be referred to herein as computer programs or simply programs. The computer programs typically comprise one or more instructions that are resident at various times in various memory and storage devices in a computer, and that, when read and executed by one or more processors in a computer, cause that computer to perform the steps necessary to execute steps or elements embodying the various aspects of the invention. Applications 126 may include integrated development environments 150 and if a server software application is included, network interface 120 may interact with the server software application to enable computer system 110 to be a network server.

It should be appreciated that computer 110 typically includes suitable analog and/or digital interfaces 116, 118, 120 between CPU 112 and the attached components as is known in the art. For instance, computer 110 typically receives a number of inputs and outputs for communicating information externally. For interface with a user or operator, computer 110 typically includes one or more user input devices 160-164, e.g., a keyboard, a mouse, a trackball, a joystick, a touchpad, and/or a microphone, among others, and a display such as a CRT monitor, an LCD display panel, and/or a speaker, among others. It should be appreciated, however, that with some implementations of computer 110, e.g., some server implementations, direct user input and output may not be supported by the computer. Terminal interface 118 may support the attachment of single or multiple terminals and may be implemented as one or multiple electronic circuit cards or other units. Data storage 172 preferably comprises one or more rotating magnetic hard disk drive units, although other types of data storage, including a tape or optical driver, could be used. For additional storage, computer 110 may also include one or more mass storage devices 166 and 172, e.g., a floppy or other removable disk drive, a hard disk drive, a direct access storage device (DASD), an optical drive e.g., a compact disk (CD) drive, a digital video disk (DVD) drive, etc., and/or a tape drive, among others.

Furthermore, computer 110 may include an interface 120 with one or more networks 140 to permit the communication of information with other computers 110 coupled to the network 140. Network interface 120 provides a physical connection for transmission of data to and from a network 140. The network may be the Internet but the network could also be any smaller self-contained network such as an Intranet, a wide area network (WAN), a local area network (LAN), or other internal or external network using, e.g., telephone transmissions lines, satellites, fiber optics, T1 lines, public cable, etc. and any various available technologies. Computer system and remote systems 110 may be desktop or personal computers, workstations, a minicomputer, a midrange computer, a mainframe computer. Any number of computers and other microprocessor devices, such as personal handheld computers, personal digital assistants, wireless telephones, etc., which may not necessarily have full information handling capacity as the large mainframe servers, may also be networked through network 140. A client is generally a personal computer that can also be a workstation having a single-user, multiple-applications whereas a server generally has an operating system that allows multiple users to execute multiple applications. Generally a client may have an operating system such as Linux, Windows; whereas a server may have an operating system such as the OS/400 or the OS/390.

While the invention has and hereinafter will be described in the context of fully functioning computers and computer systems, those skilled in the art will appreciate that the various embodiments of the invention are capable of being distributed as a program product in a variety of forms, and that the invention applies equally regardless of the particular type of signal bearing media used to actually carry out the distribution. Examples of signal bearing media include but are not limited to recordable type media such as volatile and non-volatile memory devices, floppy and other removable disks, hard disk drives, optical disks, e.g., CD-ROM's, DVD's, etc., among others, and transmission type media such as digital and analog communication links. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature. The illustrated embodiments are not intended to limit the present invention. Indeed, those skilled in the art will recognize that other alternative hardware and/or software embodiments may be used without departing from the scope of the invention.

As discussed earlier, Eclipse is a integrated development environment that is project based. Using Eclipse, a software developer, also referred to as a programmer or simply as a user, creates software by working on local copies of folders and files that are partitioned into named projects. Eclipse enables programmers to further extend one or more Eclipse-supplied or tool-supplied extension points by authoring Eclipse tools as plugins written in Java. While an embodiment of the invention is described using Eclipse as an integrated development environment to which the invention is applicable, the concepts and embodiments herein can easily be adapted and are equally pertinent to other integrated development environments used by programmers writing applications. This invention thus pertains to any integrated development environment written and extensible in any programming language. Although Eclipse and extensions to Eclipse are written in Java, the programming language is not a limitation of the embodiments described here. Eclipse is used an example of an existing integrated development environment so that one of skill in the art may will better appreciate how these embodiments herein may be used by any integrated development environment to enable access to resources on remote systems.

In Eclipse, tool writers can write tools called plugins that are registered using XML. XML stands for Extensible Markup Language and it is the universal format for structured documents and data on the Internet. The XML registration process identifies the tools to Eclipse by telling Eclipse where the Java classes, i.e., the code, exist for the plugins and the functionality of the tool by identifying which extension points are implemented. Tool writers can also define their own extension points to enable other tool writers to extend or plug into their plugins.

Eventually all software developers writing applications for the iSeries are destined to use Eclipse as the preferred integrated development environment because IBM has packaged the Eclipse IDE in its WebSphere Development Studio Client, an interactive software development studio for use on the Internet. With the prolific use of a programmable IDE such as Eclipse, many tools from various sources will continuously emerge to access remote iSeries resources to enhance the task of writing iSeries applications using an IDE. The tools will most often be written in Java, but tools may also be used to write applications in RPG, COBOL, CL, C, C++, Java and other computer programming languages and without some common framework for these iSeries remote-accessing tools, each will define their own unique and competing user interface and APIs functionality for accessing iSeries resources. At this time, it is useful to distinguish between an application program interface (API) and a user interface (UI). An API is a functional interface supplied by the operating system or by a separately ordered licensed program that allows an application program written in a high-level language to use specific data or functions of the operating system or the licensed program. APIs are functions that are called by code, not by humans. In Java, these are methods; in COBOL, these are paragraphs; in C and C++ these are functions; and in other languages, these are procedures. A user interface, on the other hand, is an interface with which a human interacts with an application.

For iSeries programmers using an IDE such as Eclipse, and for persons writing IDE tools for iSeries application development, there is a need to remotely access, query, and/or manipulate iSeries resources for their development tasks. Tool writers may access these resources programmatically via APIs. This invention leverages the teachings of the remote systems explorer framework of Ser. No. 10/286,559 entitled Framework to Access a Remote System from an Integrated Development Environment, filed concurrently herewith, in cooperation with the datastore framework of Ser. No. 10/134,190 entitled Dynamic Generic Framework for Distributed Tooling filed Oct. 31, 2001, and the AS/400 Toolbox for Java program product. What is disclosed herein is a framework that provides a set of presupplied robust framework APIs for tool writers to access remote resources. The framework, moreover, enables IDE tool writers to easily create new framework APIs for accessing additional remote iSeries resources. The framework further provides a robust common IDE user interface to facilitate access and manipulation of remote iSeries file system objects, commands and jobs with both the pre-supplied and augmented framework and/or native APIs. The framework, moreover, provides robust and well-defined extension points for tool writers to easily contribute complementary user interface views to the common IDE user interface.

The teachings herein encompass a discussion of the IBM Toolbox for Java (hence referred to as the toolbox). The toolbox is a library of Java classes supporting the client/server and internet programming model to an iSeries or AS/400 server. The classes can be used by Java applets, servlets, and applications to easily access server data and resources. The toolbox does not require additional client support over and above what is provided by the Java Virtual Machine and Java Developer's Kit. The toolbox uses the OS/400 host servers that are part of the base native operating system to access data and resources on an iSeries or AS/400 system. Each of these servers runs in a separate job on the server, communicating with a Java client program using architected data streams on a socket connection. The socket interfaces are hidden from the Java programmer by the toolbox classes.

The disclosure herein and the referenced applications refer to iSeries resources. This paragraph will discuss the resources available to the toolbox and a more complete IDE and/or tools and/or applications. These remote system iSeries or AS/400 resources include, but are not limited to, databases such as the JDBC-DB2/400 data which can be accessed using a JDBC driver written to the interface defined by the JDBC specification. Access to record-level databases allows physical and logical files on the server to be accessed a record at a time using the interface of these classes. Files and members can be created, read, deleted, and updated. The Integrated File System classes allow access to files in the Integrated File System of the server. Through the Integrated File System file classes, a Java program using the toolbox can open an input or output stream, open a file for random access, list the contents of a directory, and do other common file system tasks. Programs are also considered resources, and any iSeries or AS/400 program can be called. Parameters can be passed to the server program and data can be returned to the Java program when the server program exits. A framework to call programs is provided via a program call markup language (PCML), a tag language used for supporting the program call function of the toolbox. The language fully describes all parameters, structures and field relationships necessary to call an iSeries or AS/400 program. Commands are also resources and any non-interactive iSeries or AS/400 command can be run from the toolbox. A list of OS/400 messages generated by the command is available when the command completes. The toolbox may further access both keyed and sequential data queues. Entries can be added to and removed from a data queue, and data queues can be created or deleted on the server. Using the job classes, one can retrieve messages in a job log, information about a job, such as name, number, type, user, status, job queue, and more, or get a list of jobs based on a particular selection. Messages, message queues, and message files can also be accessed by the toolbox and are considered resources. Using the message classes, one can retrieve a message generated from a previous operation such as a command call, information about a message on a message queue, and interact with a message queue allowing one to send, receive, and even reply to messages. Users and groups and user spaces may be accessed, and the user space class may read, write, create, and delete user spaces on the server. Access to various kinds of data areas, e.g., character, decimal, local, logical, is allowed by the toolbox. Entries can be added to and removed from a data queue, and data queues can be created or deleted on the server. The data area classes are used to read, write, create, and delete data areas on the server. System values and network attributes can be queried and reset on the server. The toolbox further permits retrieval of system status information. Using the SystemStatus class, a person can retrieve information such as the total number of user jobs and system jobs currently running on the server, and the storage capacity of the server's auxiliary storage pool.

Figure 3:
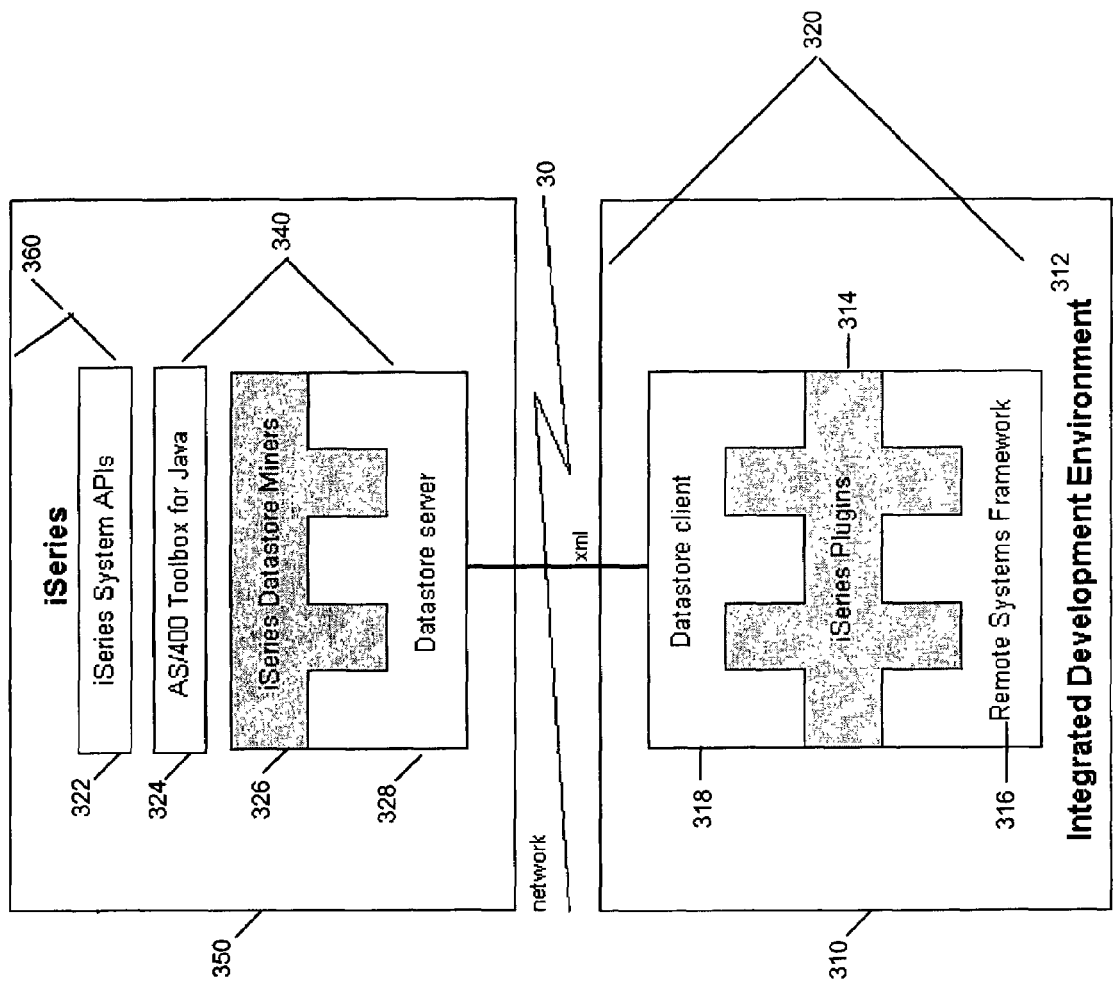
FIG. 3 is a simplified block diagram of an integrated development environment accessing a remote iSeries system.

FIG. 3 illustrates an integrated development environment 312 on a client 310 accessing a remote iSeries server 350 across a network 30. The integrated development environment 312 has a number of plugins 314 that plug into the remote systems framework 316 and the datastore client 318 to offer access to remote resources on the server 350. This client-side tier 320 of at least the framework 316, the plug-ins 314, and the datastore client 318 is complemented by server-side tier 340 that plugs into the datastore server 328, and leverages the toolbox 324 to access the native system APIs 322 which in turn access the remote resources. The native system APIs 322 written in Java have a unique communication layer that leverages the datastore technology 318, 328 and the toolbox 324 so programmers can retrieve filterable lists of the remote resource objects and then to execute remote commands on those objects.

As mentioned above, the access to the remote resources by the various tools in an integrated development environment can be considered as being comprised of three tiers: a client tier 320, a server tier 340, and the resources tier 360. The communication bridge between the client tier 320 and the server tier 340 is the datastore technology comprising the datastore client 318 and datastore server 328 technology, the subject of Ser. No. 10/134,190 entitled Dynamic Generic Framework for Distributed Tooling filed Oct. 31, 2001, that, inter alia, offers the ability to create Java-authored communications code. The datastore client 318 communicates with the datastore server 328 to submit requests and retrieve results but the datastore server 238 does the actual communication with the remote system to access its resources. The datastore client 318 is where the framework APIs that enable IDE tool writers easy access to the remote resources are created. Any user interface desired by the tool writer is then built on top of these framework APIs, i.e., a user interface uses these framework APIs and visualizes the resources they access.

Figure 4:
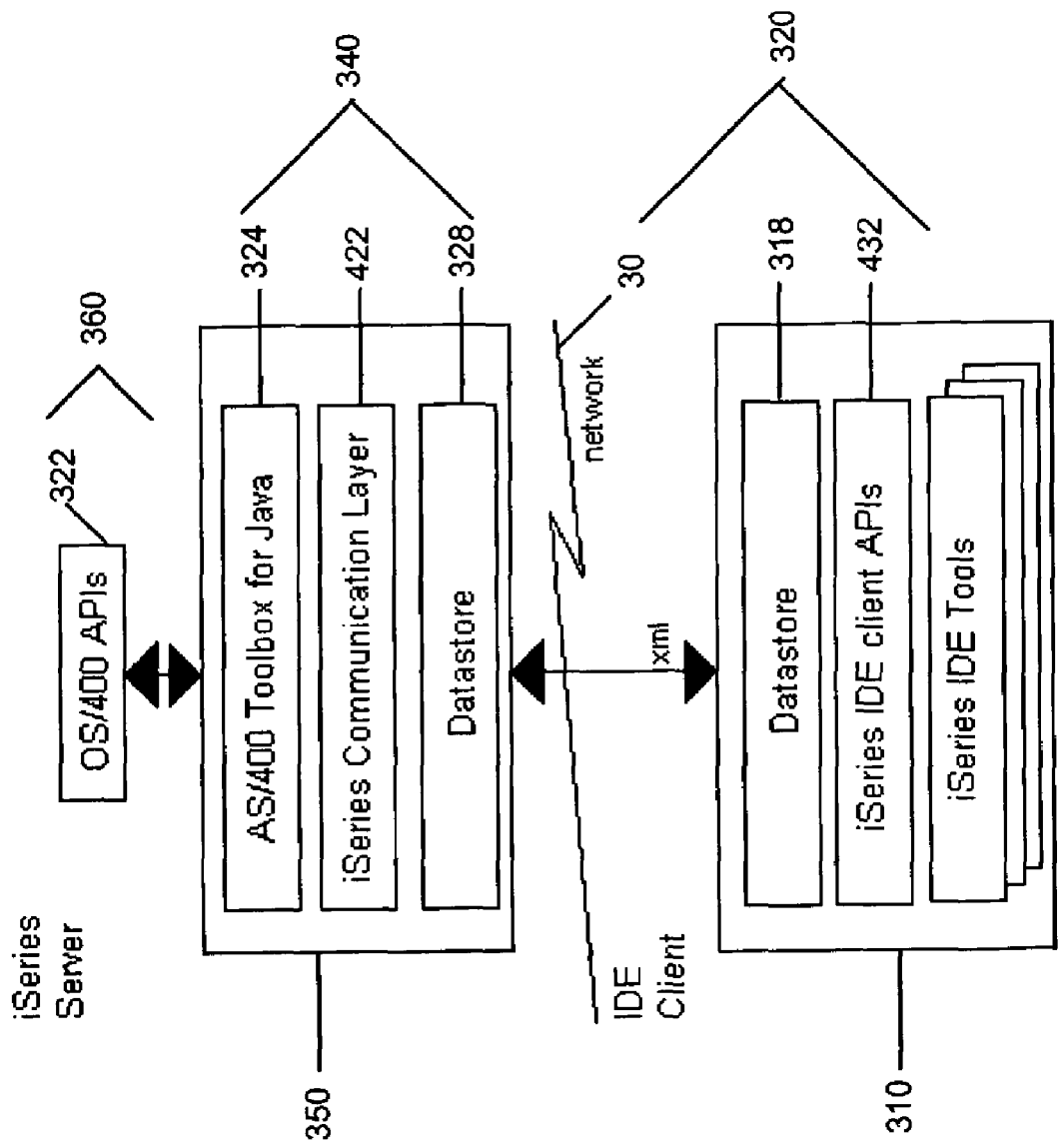
FIG. 4 is a simplified block diagram of an integrated development environment accessing a remote iSeries system illustrating three tiers in accordance with an embodiment of the invention.
Figure 5:
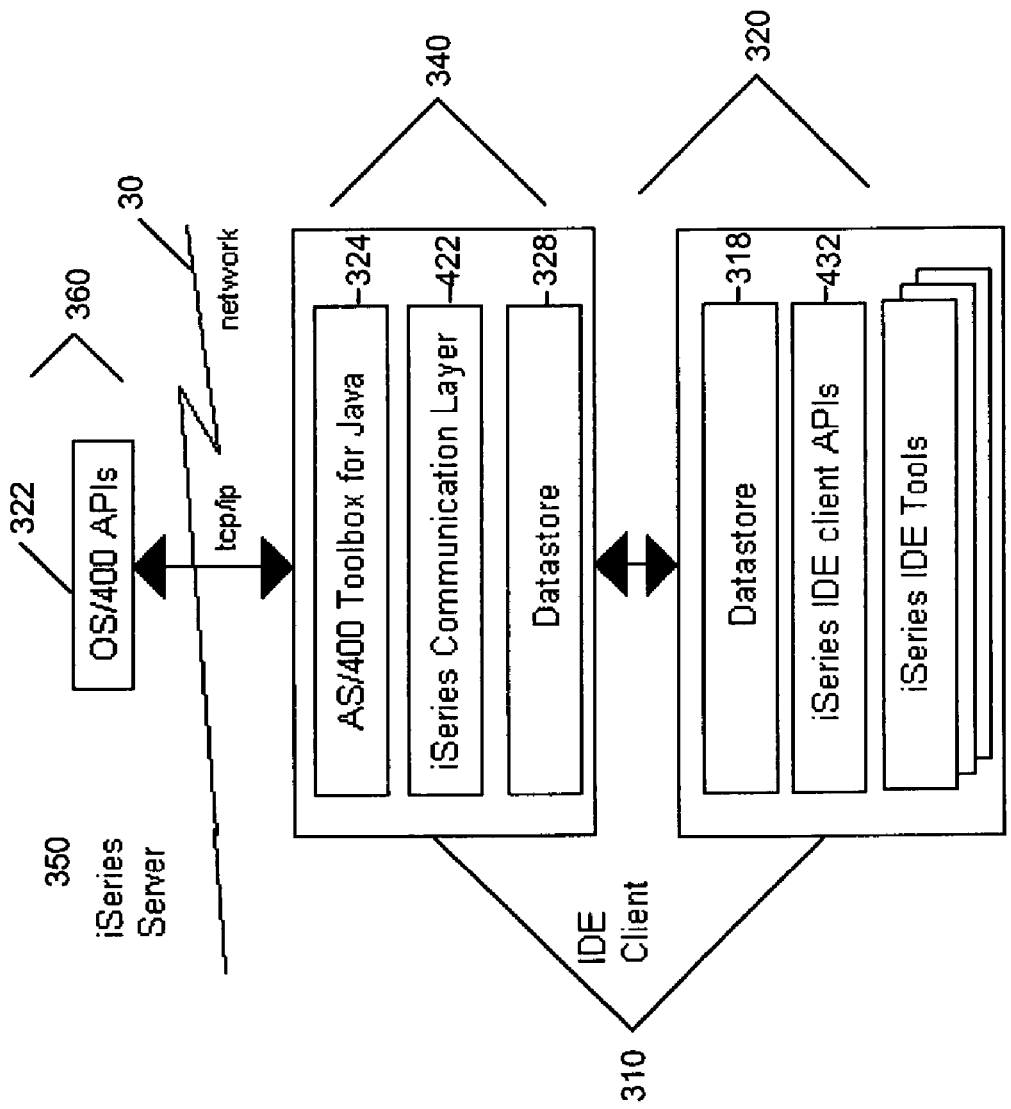
FIG. 5 is a simplified block diagram of another embodiment of the three tiers showing an integrated development environment on the same computer system as the datastore technology and the toolbox accessing the native system APIs across a remote connection.
Figure 6:
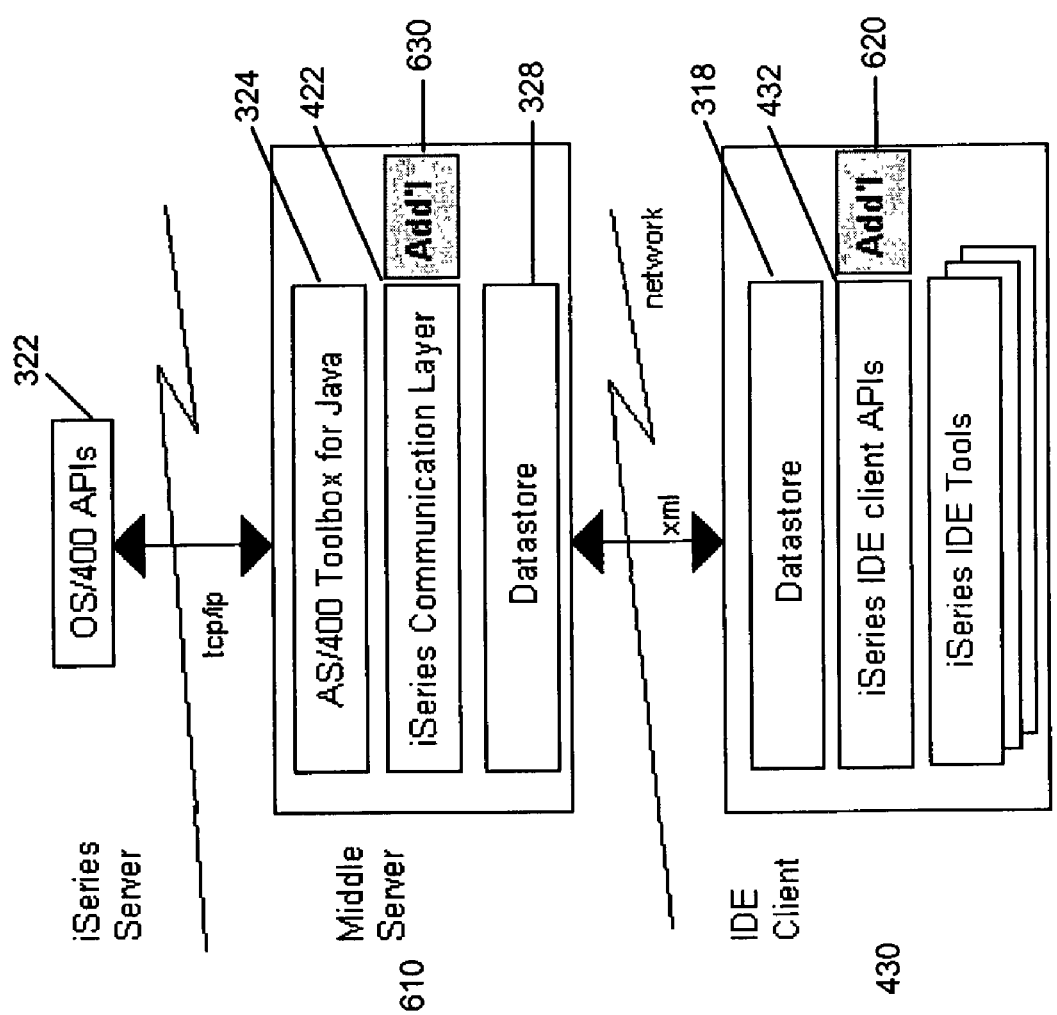
FIG. 6 is a simplified block diagram of the three tiers on separate computer systems across networks in accordance with yet another embodiment of the invention.

This server tier 340 can be run locally on the user's workstation, or remotely. When run remotely, the server tier 340 can run on the remote server 350 itself or any another server, as long as the communication code that communicates with the remote system can run remotely. FIGS. 4, 5, and 6 illustrate different configurations of the three tiers: the client tier, the server tier, and the native APIs and remote resources. The core communication layer 422 uses the toolbox 324 to communicate with the operating system or native APIs 322, and because the toolbox 324 is portable, moreover, so also is the communication layer 422. The client tier or framework APIs 432 use the datastore client 318 to send data to and receive data from the communication layer 422. This allows flexibility in where the communication layer 422 and its precursors—the toolbox 324 and the datastore server 328, are placed at runtime. In FIG. 4, the server tier resides 340 on the same remote server 350 being accessed. In FIG. 5, the server tier 340 and the client tier 320 resides on each client 310; this configuration can be helpful when the remote server 350 is not robust enough to efficiently run the server code. Another configuration, in FIG. 6, has an intermediate server 610 which runs the server tier 340. The intermediate server 610 can have any operating system that supports Java. Thus, it can be seen that the various combinations of the datastore technology 318, 328 with the toolbox 324 allow configuration flexibility.

Whatever the configuration, the framework APIs 432 available to IDE tool writers are designed so that tool writers need not be aware of the underlying technology, such as the datastore technology 318, 328 for communications and the toolbox 324 to access the native APIs 322. The abstraction of using the toolbox 324 with the datastore technology 318, 328 with the different tiers 320, 340, and 360 inspire the development and use of alternative technologies.

The framework APIs 432 are Java classes that, inter alia, allow retrieval of lists of native file system and IFS object names and properties, of lists of native OS/400 jobs, and further allow remote execution of commands with local feedback. The file system and job lists can be subset using name and property patterns. There are also other framework APIs 432 for transmitting source files to and from the iSeries and the local client workstation. The framework APIs 432 available to tool writers are implemented using the subsystem framework from the Ser. No. 10/286,559 entitled Framework to Access a Remote System from an Integrated Development Environment. A particularly useful feature of the framework is that each tool that accesses remote system resources registers its subsystem factories with the framework. These subsystem factories create a unique subsystem object for every connection the user defines. For every connection to a remote system that the IDE user creates, the framework furnishes five subsystem factories that create an instance of their corresponding subsystem. The tool writer who wishes to author tools that require access to remote resources chooses the appropriate subsystem and then uses the specific framework APIs supplied by that subsystem.

One subsystem factory is an Objects subsystem factory for accessing native file system objects using filters that define the path and the name and/or type pattern by which to subset the list. The framework APIs within the Objects subsystem are listLibraries, listObjects, listMembers, listRecords, and listFields, each of which take one or more path and name filters and return a concatenated list of objects that represent the objects which match the given filters. Each object has a unique Java class that encapsulates attribute information for the remote object, thus the AS400Library, AS400Object, AS400Member, AS400Record and AS400Field are created by the framework APIs 432 of the Object subsystem factory. Further, there are getMember and putMember methods in this Object subsystem to copy source members from the iSeries to a local file, and vice versa. While the prefix AS400 is used in the naming convention because is the historical name for the iSeries computer, the actual names of the APIs are not germane to the disclosure herein.

The framework supplies another subsystem factory—the Commands subsystem factory that executes commands in the native command shell from the IDE. For the Commands subsystem factory, the IDE user sees a list of presupplied commands that can be run by selecting Run from the context menu. Users, moreover, may define their own commands that will be conveniently displayed when the subsystem is expanded. The command is submitted to the Commands subsystem factory which submits the command to the remote system for execution. The success of the command and any resulting output are returned to the Commands subsystem factory on the client. The Commands subsystem has one key framework API: the runCommand whose input is a single OS/400 command to be run, and whose output is a boolean value indicating success of the command. There is also a getMessages method to return any messages issued by the last command to be run.

A third Jobs subsystem factory furnished by the framework accesses active jobs in the native job system. Active jobs are accessed by filters that define the scalar or generic attributes for the jobs to be listed, such as job name, number, user and status. The Jobs subsystem also has only one key framework API, listJobs, whose input is a filter that describes the attributes of the jobs to be listed, such as job name, job number, job user and job status. Each attribute in the filter can be*for all or a specific name. The method returns a list of objects of class type AS400Job representing the jobs that match the filter, and this class has further methods for querying the various attributes of that job. For the Jobs subsystem, the users sees a list of presupplied filters, such as My Active Jobs that lists the current active jobs. A user may also define their own filters. When a job filter is expanded, the remote jobs are displayed as children, and the user can choose numerous actions from the context menu of those jobs, such as to cancel, stop and resume the job.

Another subsystem factory is the IFS Files subsystem factory, which accesses folders and files in the Integrated File System, the Unix-like file system on the iSeries operating system. IFS objects are accessed by filters that define the path and the name pattern by which to subset the list. The IFS Files subsystem has listFolders, listFiles and listFoldersAndFiles as key framework APIs. Each of these key methods takes a path defining where to start the list and a generic name to subset the contents of that path. If*is passed for the generic name, then all contents are listed. Further, the methods all take a boolean parameter indicating if the list results should include the contents of subfolders as well or not. Each object returned is of class type IFSFile, which has methods for querying the various attributes of the remote file or folder it represents. Further, getFile and putFile methods in this subsystem copy IFS files from the iSeries to a local file, and vice versa. The IFS Files subsystem is similar to the Objects subsystem, but lists folders and files in the IFS rather than the libraries, objects and members in the native file system.

Yet another subsystem factory is the IFS Commands subsystem factory executing commands in the IFS command shell, Qshell, from the IDE. In the IFS Commands subsystems, the IDE user sees a list of presupplied commands that can be run by selecting Run from the context menu. Users, moreover, may define their own IFS commands that will be conveniently displayed when the subsystem is expanded. The IFS Commands subsystem factory submits the command to the remote system for execution. The success of the command and any resulting output are returned to the client. The IFS Commands subsystem also has only one key method: runCommand which takes as input a single QSHELL command to be run, and returns a boolean value indicating success of the command. There is also a getMessages method to return any messages issued by the last command to be run.

The underlying framework and technology used to create the framework APIs is a key component of the remote access and editing of remote files on the iSeries. By using only datastore technology on the client, the framework APIs are able to push the heavy-lifting to the server tier where the Java code that accesses the native APIs exist, as opposed to the client tier; this keeps the client thin and encourages alternative clients for the future. For example, because the datastore uses XML, which is particularly well suited to HTTP communications, the client code to transfer data between a server tier and a client tier may execute on a Web browser. Because as is known in the art, the most difficult part of client/server computing is the communication layer, it is easier to add additional support when implementing the tiered architecture.

For many tool writers, the framework APIs will be enough to write compelling Eclipse tooling that works seamlessly with remote iSeries artifacts, but just in case, however, the framework APIs are not sufficient, the whole framework is extensible. Tool writers can augment the communication layer 422 by writing additional Java code to access additional native APIs using what mechanism is available or convenient, such as more of the toolbox functionality or JDBC or even Java Native Interface APIs. The tool writer could author additional framework APIs within the IDE to programmatically expose their new functionality to the IDE. FIG. 6 illustrates the possibilities of the additional code ("Add'l") 620, 630 to extend the functionality of the communication layer 422. These additional APIs 620, 630 would submit the datastore request to their server-side datastore extensions 328, and parse the information returned by the datastore into Java objects consumable by any client IDE code which calls the framework APIs 432. What the Java class does when the user selects the tool-writer's context menu item was decided by the tool writer, and not by the integrated development environment or by the system itself. The tool writer has the full power of the framework's APIs so, for example, she/he might open a new view or alternative editor. To facilitate that view or editor, the tool writer can use all the framework APIs supplied by the subsystems for accessing remote resources, or her/his own APIs if she/he has extended the API framework as described previously. The tool writer benefits because she/he needs only a fraction of the development effort typically needed to write tools and need only concentrate on a single menu item and its user interface and possibly new APIs written to the framework. Tool writers need not author either a user interface or complex client/server communication layers. The user of the integrated development environment benefits from having a single user interface view, the remote systems explorer, which facilitates the discovery and use of all new and presupplied tools available to them.

The framework APIs within the integrated development environment and the flexible three-tiered infrastructure are but one chapter of the story. Another chapter is the user interface within the integrated development environment that builds on these framework APIs. By integrating the framework APIs with the remote systems explorer, the IDE user is able to visualize and access remote resources in the drill down hierarchical tree user interface of the framework, called the remote systems explorer.

Figure 7:
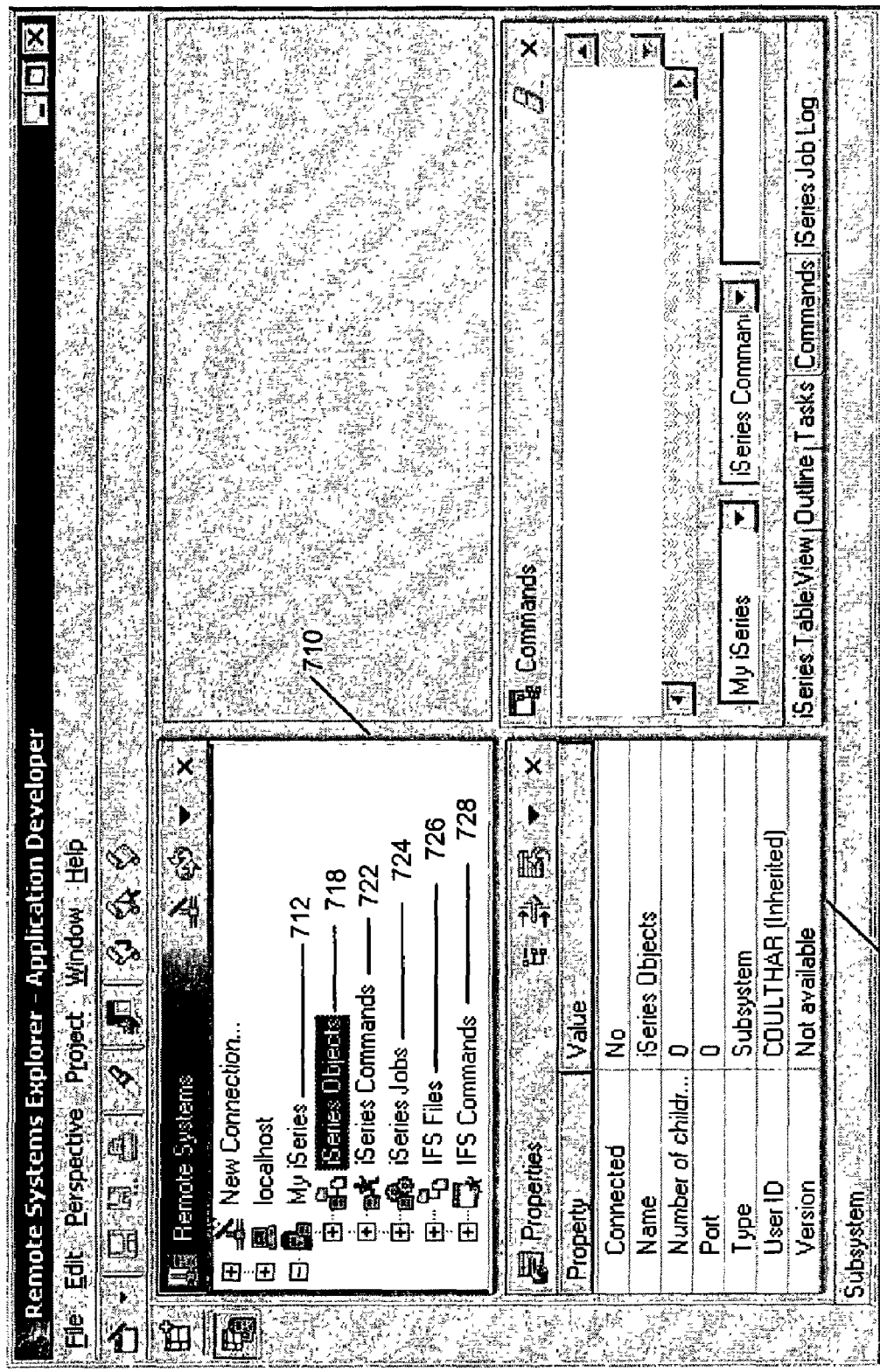
FIG. 7 is a view of a graphical user interface of the framework accessing iSeries subsystems in accordance with an embodiment of the invention.

Recall that the five subsystem factories of the framework create the five subsystems when the connections are first defined. An expanded iSeries connection in the remote systems explorer user interface with tree-nodes representing those five subsystems is shown in FIG. 7. The remote systems explorer 710 is the view in the upper left and contained within the view is a single iSeries connection 712 named My iSeries. The My iSeries connection 712 has been expanded and the five iSeries subsystems-iSeries Objects 718, iSeries Commands 722, iSeries Jobs 724, IFS Files 726, and IFS Commands 728 are displayed. FIG. 7 also has two other views: in the lower left is the Property Sheet 740 view which is a common Eclipse-supplied view that shows properties about the object selected in the remote systems explorer; and in the lower right is a Commands 760 view which is an additional view supplied by the iSeries tools and is opened by an action from the right click context menu of the iSeries Commands 722 subsystem. From this Commands 760 view, users can enter iSeries commands to be remotely executed in either the native command shell or the Unix QShell command shell. The results of the command are logged in the view. This view simply uses the framework's runCommand API of the Command subsystem.

Depending on what remote resources the IDE user wants to work with, they would expand one of the five subsystems, 718, 722, 724, 726, 728. Each subsystem implements the getChildren method of the Subsystem Java interface to enable expansion by the user. What the user sees in all cases are the presupplied filters that are simply strings that allow the user to subset the list of resources seen. The user can use the presupplied filters or create their own. When a filter is expanded, the remote iSeries resources matching the patterns in the filter are displayed under that filter.

Figure 8:
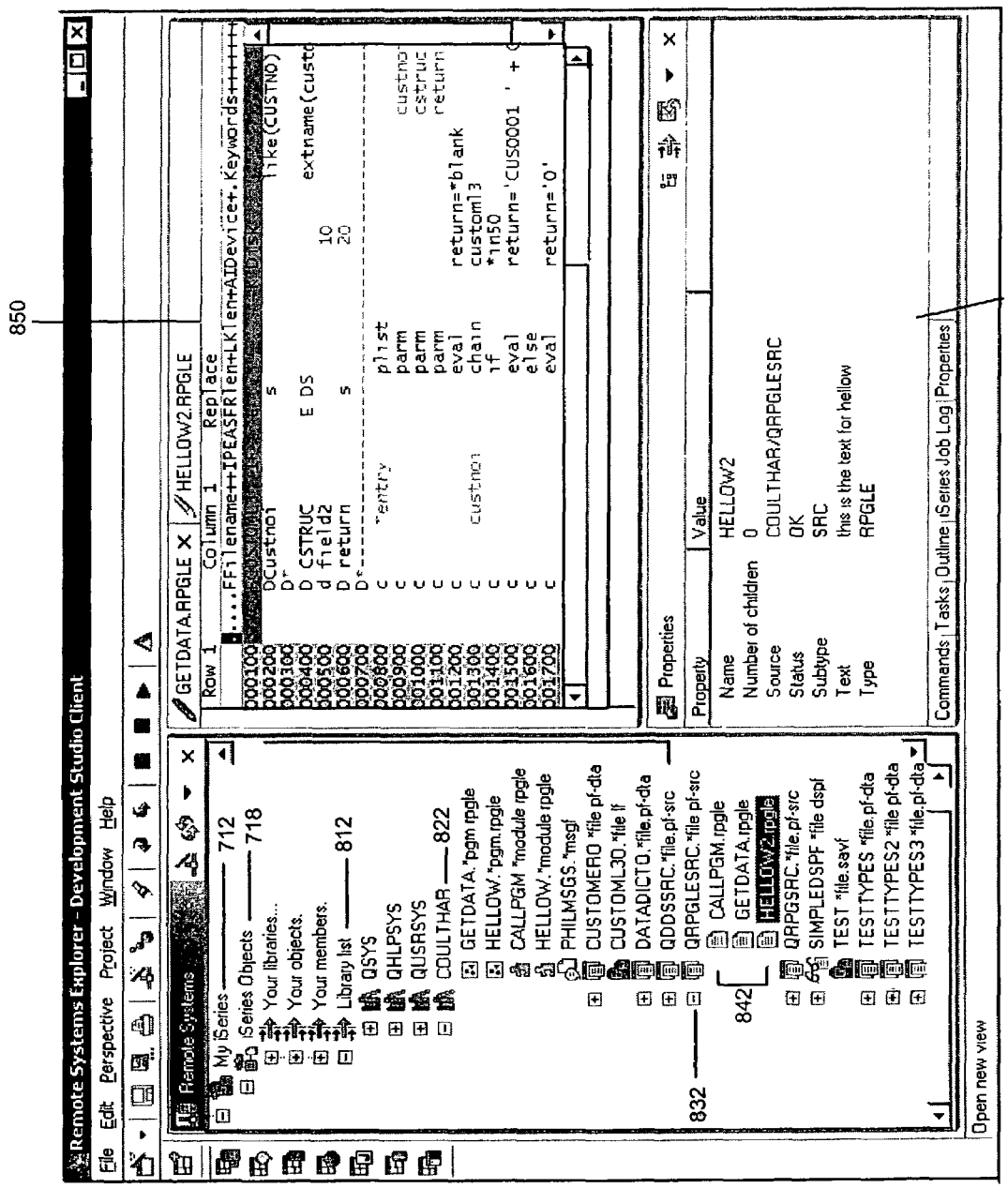
FIG. 8 is a view of the framework's graphical user interface allowing editing of remote files in accordance with an embodiment of the invention.

FIG. 8 shows the Objects subsystem 718 and the Library List filter 812 expanded. In FIG. 8, the expansion of the Library List filter 812 resulted when the listLibraries method of the Objects subsystem object was called to return the list of libraries in the user's library list. The results are displayed as children of the Library list filter. Further, the COULTHAR library 822 has also been expanded which calls the listObjects method of the Objects subsystem and, as a result, the resources are displayed as children of the COULTHAR library node 822. The QRPGLESRC source file 832 has been expanded which calls to the listMembers method and the resources are displayed as children nodes. To enable this expansion of subsystems and child objects, appropriate remote systems adapter objects are required by the remote systems explorer to supply the display names, icons, child objects and right-click context menu items.

The remote systems adapter objects are also responsible for supplying the properties displayed in the property sheet view 860 shown in the lower right of FIG. 8. The right-click context menu 900 in FIG. 9 supplies a variety of actions to act upon the remote resources. A user can edit a remote resource with an Open With Lpex Editor menu item 910 for source member resources. This action, when chosen by the user, opens the Lpex editor view 870 shown in the upper right in FIG. 8. The Lpex editor view 870 uses the getMember method of the Objects subsystem to copy the member to a local file for editing and then uses the putMember method to return the edited code when the IDE user uses the save action of the editor.

Figure 9:
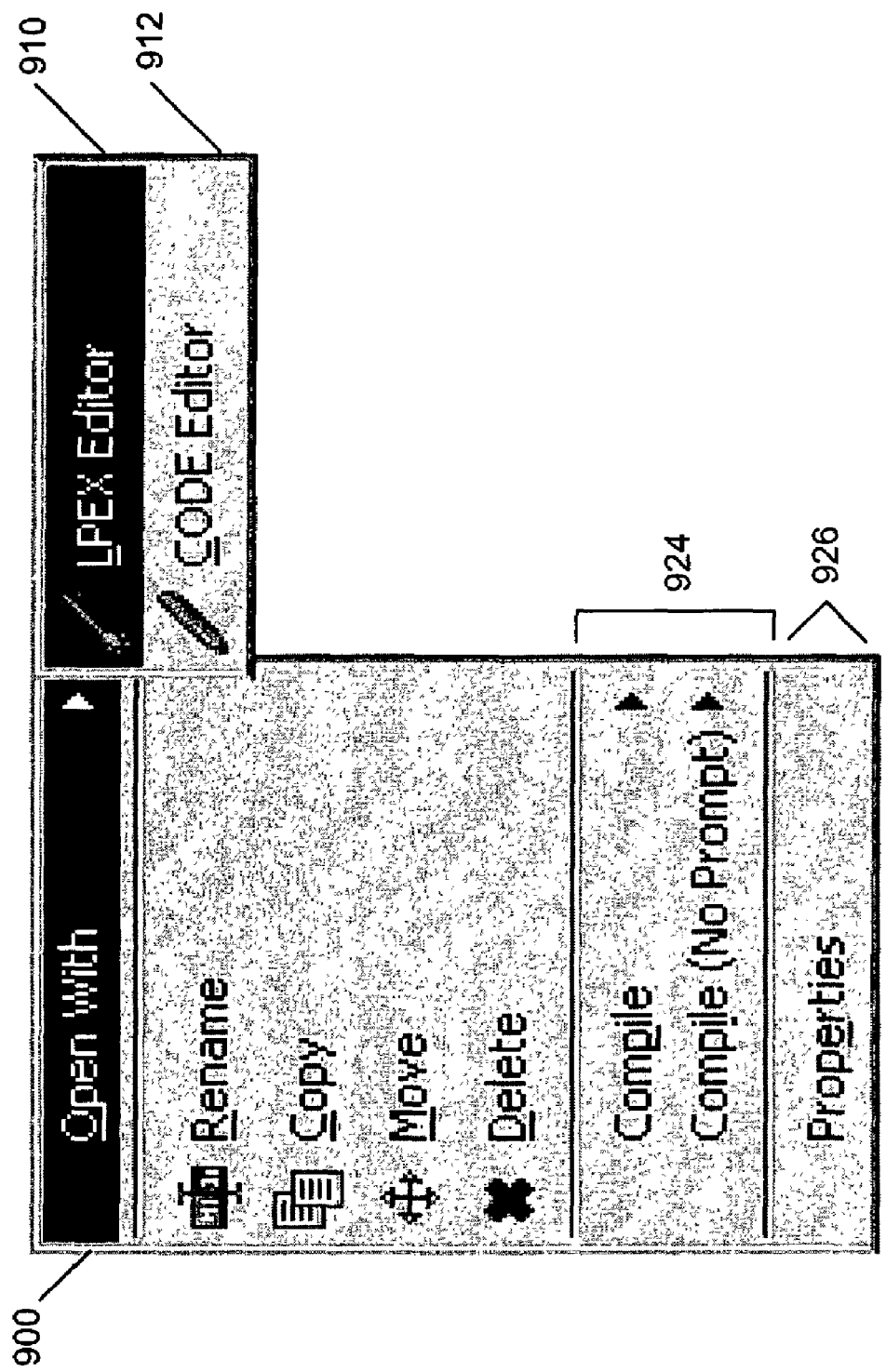
FIG. 9 is a view of a context menu to be shown in the framework's graphical user interface to edit files from a remote system in accordance with an embodiment of the invention.

In FIG. 9, the context menu 900 offers the IDE user a rich development experience for the purpose of developing iSeries applications. All these actions are possible because of the relatively small set of framework APIs and remote system adapter objects supplied by the subsystems. For example, the menu items to edit 910 and 912, rename 914, copy 916, move 918, delete 922, and compile 924, as well as a full suite of properties 926 for the selected member result in commands being submitted to the Commands subsystem via its runCommand method. In addition, it is easy for tool writers to contribute additional menu items to any presupplied context menu for the resources displayed in the remote systems explorer underneath any of the five subsystems. The remote systems adapters when returning the list of menu items to show in the context menu for a remote resource look for and include any externally-registered menu items in the list returned the remote systems explorer such that they will appear in the context menu 900. A tool writer contributes her/his menu items by registering them with the iSeries tooling. How this registration is done depends on the particular integrated development environment, but what is important to remember is that the registration offers the tool writer a way to identify the following information for each of their menu items: a unique ID for the menu item contribution; a name and optional icon to display in the context menu; the Java class to call when the menu item is selected by the IDE-user; the resource type(s) of the remote resource for which this applicable menu item; and the object type(s) of the remote resource this applicable menu item.

For Eclipse, this registration is enabled by a supplied extension point named com.ibm.etools.systems.core.popupMenus. To register a menu item, a tool writer includes xml in their plugin.xml file, which identifies this extension point and supplies the required information via xml tags and attributes. Following is an example of xml used to register a menu item:

```
<extension
    point="com.ibm.etools.systems.core.popupMenus">
  <objectContribution
      id="actions.sample1"
      typecategoryfilter="MEMBERS"
      typefilter="RPGLE"
  >
    <action id="actionSample 1"
      label="Sample Action for Members"
      class="samples.actions.SampleMemberAction">
    </action>
  </objectContribution>
</extension>
```

In this example, the tool writer has supplied a menu item named Sample Action for Members which, when selected by the IDE-user, will result in the Java class samples.actions.SampleMember Action being invoked. A filtering mechanism has a coarse grained filter that identifies the type of resource, the typecategoryfilter attribute, and a finer grained filter that further limits the resources to a particular type attribute, the typefilter attribute. Because of the filters, the context menu will display items for members having the member type is RPGLE. Thus, this extension mechanism offers robust scoping so the menu item only appears in the context menu for specific resources.

In one aspect of editing a remote resource, a user right clicks on a remote file in the remote systems explorer view of FIGS. 7 and 8, and may open it, for instance, in the LPEX editor 910 of the context menu 900. The file is retrieved to the client machine using the datastore technology and opened in the LPEX editor. This retrieved and open file is temporary to be deleted when the user closes the editor but while the file is open in the editor, the user can edit the code and save it when required. When the user tries to save the edited contents, the temporary file is first saved on the client machine and then the temporary file is then saved to the server using the datastore communication stream. The retrieval and saving of the remote file happens invisibly to the user so from her/his perspective it is as if she/he were editing a local file. No manual action is required by the user to retrieve or save the remote file. Remote editing of members in the iSeries native file system is supported only by the LPEX editor while remote files in the iSeries integrated file system, Linux, Windows or Unix, is supported by not only the LPEX editor, but also the default text editor provided by Eclipse, and the operating system editor associated with the remote file extension.

Figure 10:
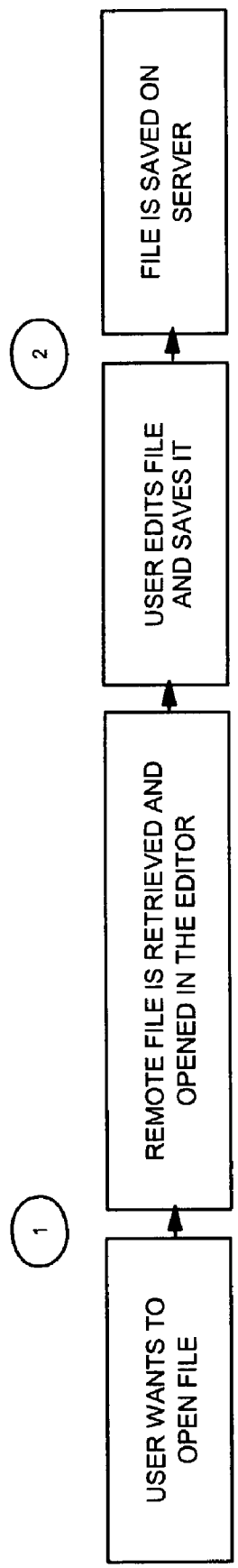
FIG. 10 is a simplified flow chart of a process by which a remote file can be retrieved and edited in accordance with an embodiment of the invention.

FIG. 10, which provides a high level view of the process by which a remote file is being edited. There are two points of interest, marked as 1 and 2 in the diagram, both of which deal with the relationship to the datastore technology. In order to provide correct support for remote editing of files in a truly multiplatform environment, correct translation between different systems must ensure that the files will not be corrupted during transfer, editing, and restoration. For example, when transferring a file from a Unix variant or Linux to Windows, one needs to ensure that the end-of-line (EOL) characters are changed. The Unix system uses an EOL character with byte value 10 (decimal) while Windows uses two characters with byte values 13 and 10 respectively (decimal) to indicate EOL. Also, different machines can have different character sets and encodings depending on where the machines are geographically located. Certain encodings such as the EOL characters and locale specific translation, moreover, do not apply to binary files such as images (gif, jpeg, etc.) or executables so there must be a protection mechanism in place so that no conversion takes place for binary files.

Figure 11:
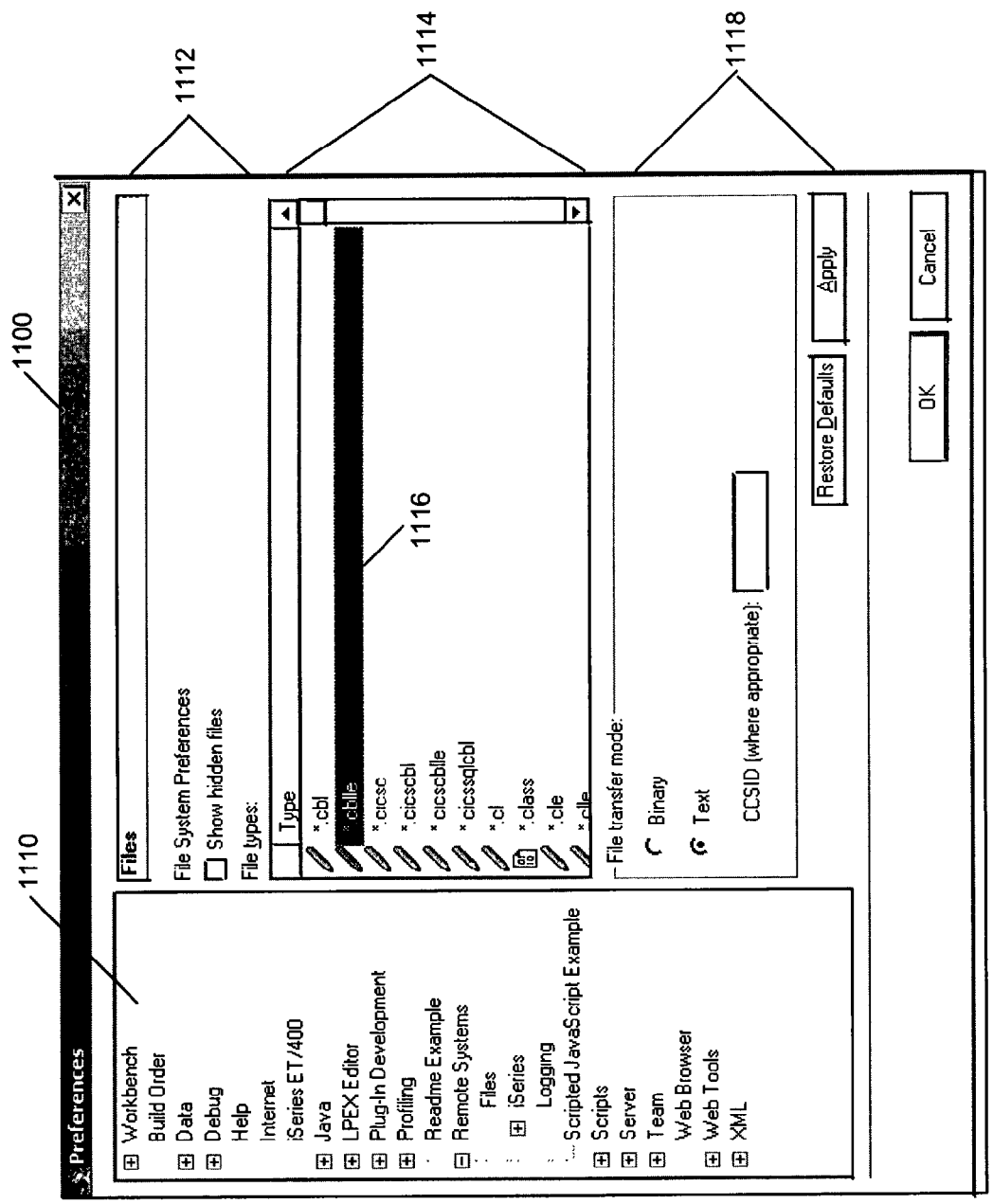
FIG. 11 is a view of a graphical user interface of an integrated development environment illustrated the coding of characters and type of file to allow editing of a file from a remote system. It is suggested that FIG. 11 be printed on the face of the patent.

FIG. 11 is a screen shot of a graphical user interface of a preference page 1100 of an integrated development environment, such as Eclipse, in which users can select a file type as shown in the block 1114, and specify the file transfer mode for a file of that type as in view 1118. If a file transfer mode is text, a Coded Character Set Identifier (CCSID), a character set coding scheme may be automatically determined or, alternatively, users may enter the CCSID, as in view 1118. When users want to open remote files, the preferences such as shown in the view of 1112 may determine the mode of file transfer. Until now, the option to set a file transfer mode was available only on FTP software and not in editing environments such as Eclipse. By having this preference page 1100, increased functionality and flexibility is enabled for the tool writer. Furthermore, the preference page 1100 also caters to iSeries users and provides a single, uniform way of handling file transfers in a multiplatform client server environment and across different locales.

Figure 12:
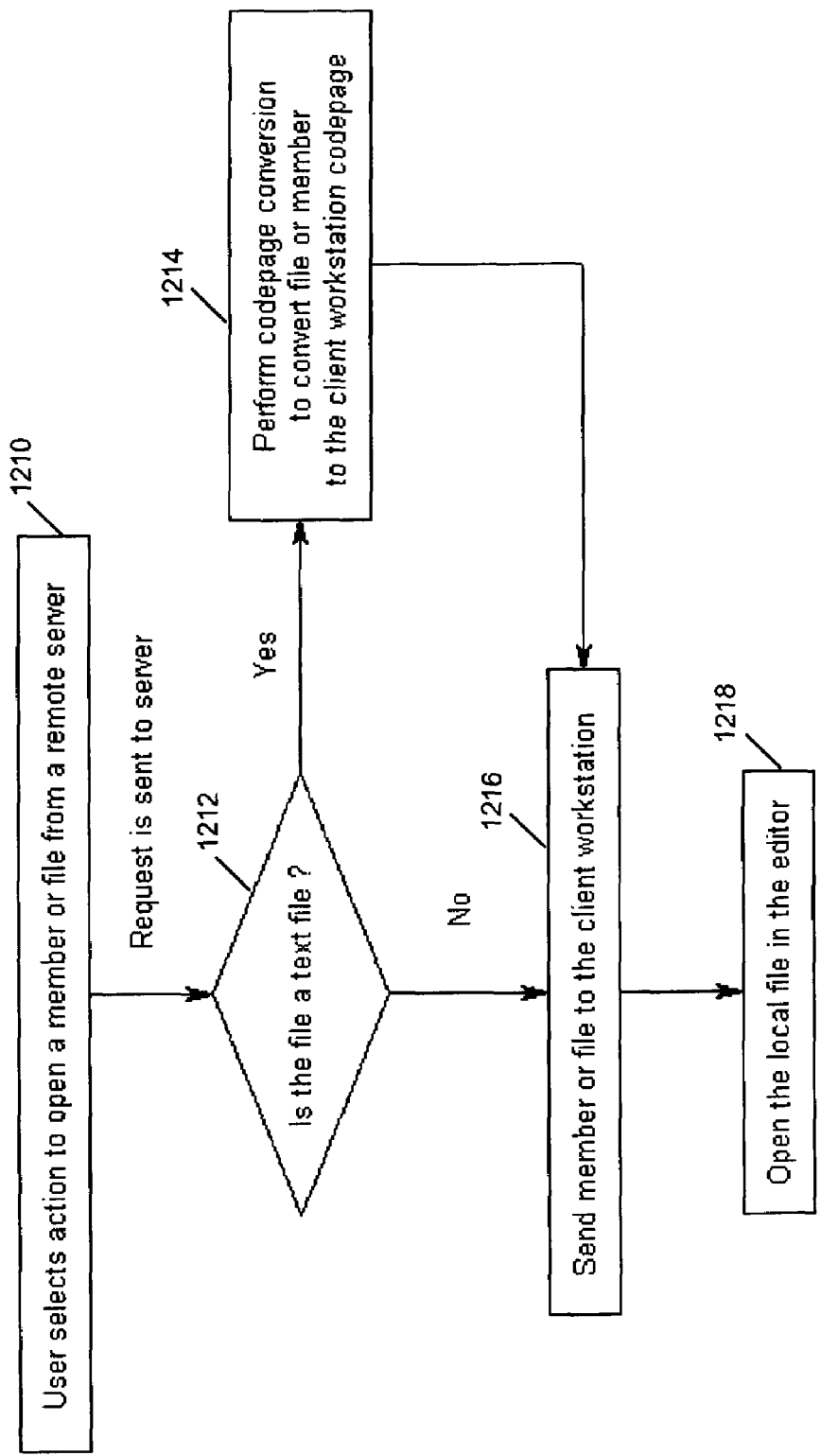
FIG. 12 is a simplified flow chart by which files can be retrieved from and converted to a editable format on a client workstation.

FIG. 12 is a simplified flow diagram of the process by which the editing capability uses the datastore technology. Beginning at step 1210, a user selects an action to open a member or file from a remote server. The user preferably uses the user interface of the remote systems explorer to select the file and may determine the file transfer mode from the user preference settings by examining the file extension. A request is sent to the datastore client to retrieve the file from the remote server. Some attributes, also called metadata, are passed include the encoding of the workstation and the file transfer mode. The request is sent to a datastore server, which reads the file using, e.g., Java Runtime Environment classes on Linux, Windows and Unix or using the toolbox on iSeries. If the text is binary, as in step 1212, the file is sent to the client directly as in step 1216. Otherwise, if the mode is text as in step 1212, the file is converted to the client encoding in step 1214 and then sent to the client 1216. Pertinent metadata, e.g., the server encoding and last modified time of the file, and, for an iSeries member, the record length, etc., may also sent to the client. The datastore client writes the received bytes to a temporary file on the workstation and caches the information for use. Then, in step 1218, an appropriate editor can open the converted file in the client.

Figure 13:
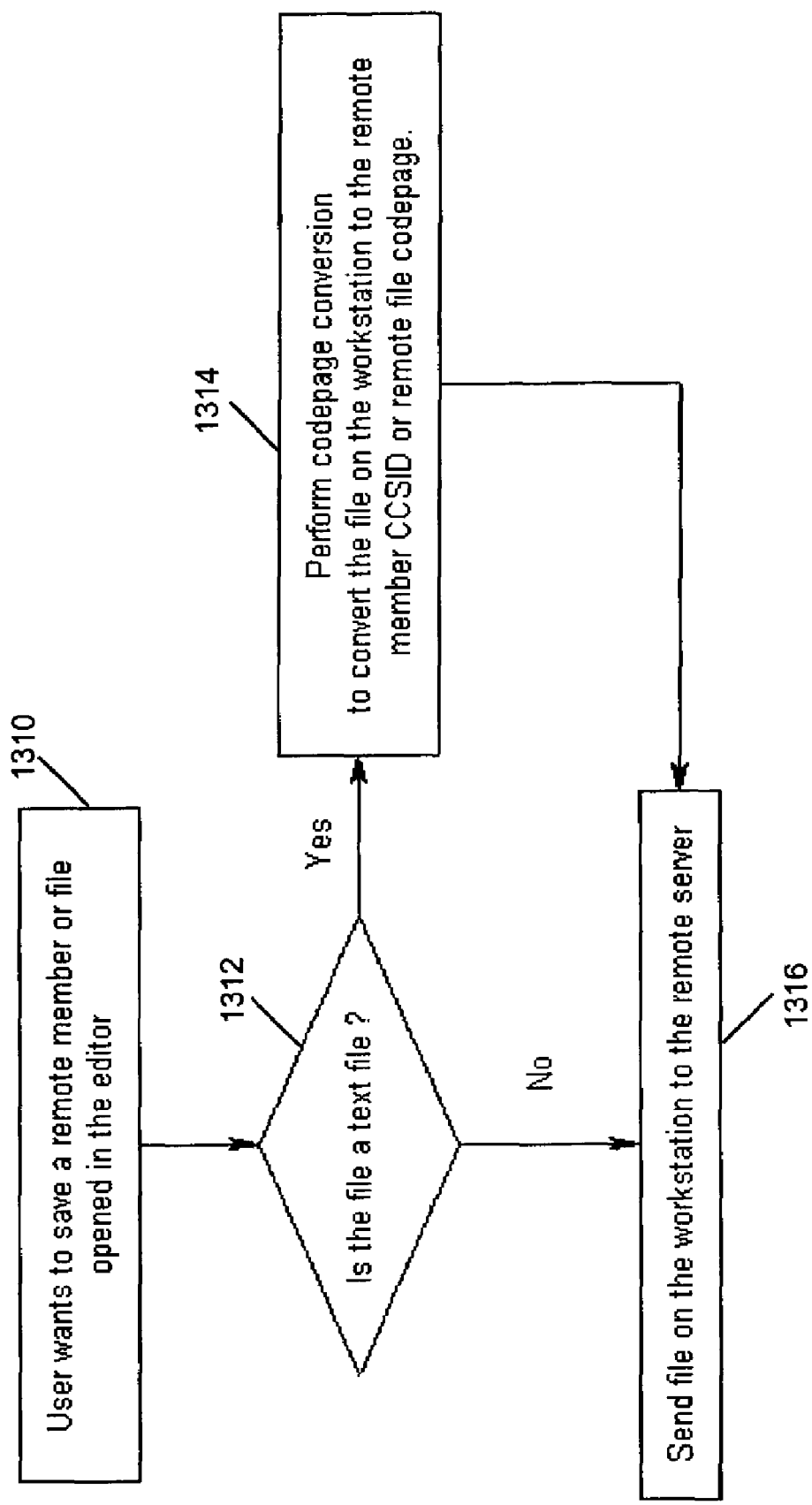
FIG. 13 is a simplified flow chart by which files edited on a client workstation can be saved and restored to a remote server.

Once the temporary file is opened in the editor on the client workstation, the user can then work with this file and save it when needed. To save an edited file, the process is described in the simplified flow chart of FIG. 13. First the user, generally a tool writer or a user of an integrated development environment, wants to save a remote member or file that was open in an editing application, as in step 1310. The editor content is saved to the temporary file on the client workstation and the file transfer mode is determined from the preferences. A request is made to the datastore client to send the temporary file, along with the transfer mode. The client reads the temporary file. If in step 1212, the file is binary, then in step 1316, the file is sent to the server immediately. If, however, the file is a text file, then in step 1314, the file is converted to the server encoding and sent to the datastore server. The datastore server writes the received bytes to the file on the server.

Using the above algorithms, the invention provides hidden remote file editing support for users, so the user does not have to do anything manually to transfer files between the client and the server. When a user edits a files and performs a save, the editor contents are automatically saved to the server. The temporary file is deleted when the user shuts down the editor. The integration with an integrated development environment, such as Eclipse, is thus seamless and to the user it is no different than editing a local file.

Thus, what has been disclosed herein is a common framework that supplies: (1) a number of presupplied framework APIs for accessing the most common remote iSeries resources thus reducing the programming burden for tool writers; (2) a framework for easily extending the framework APIs by authoring new APIs that not only follows the same conventions and standards as the framework APIs but also reduces the programming burden typically required to author new client/server communication APIs; (3) a user interface framework, the remote systems explorer, that leverages the API framework to visualize the remote resources exposed by the APIs to reduce the programming burden of the tool writer to author these user interfaces, and offers the user a consistent and compelling user interface experience across all remote-accessing iSeries tools. This user interface is also easily extensible by tool writers, so that iSeries tools from many sources may complement each other to enrich the IDE user's development experience. All of this makes any integrated development environment easy to use and more productive for the development of iSeries tools and applications.

In particular, iSeries programmers are given direct access to iSeries resources from within an integrated development environment or other editing program. Programmers are now able to open, edit and save a remote file seamlessly, as if the file existed on the user's local workspace. No manual action is required by the user to transfer files between the client and the workstation. The use of the datastore architecture, automatic codepage conversion of files between the client workstation and the server and allowing users to specify whether files of a certain type are to be treated as text or binary, provides an integrated and flexible solution to the user's needs.

While various embodiments of the present invention have been described above, it should be understood that they have been presented by way of example and not limitation and that variations are possible. Thus, the breadth and scope of the present invention should not be limited by any of the above-described exemplary embodiments, but should be defined only in accordance with the following claims and their equivalents.

The embodiments of the invention in which an exclusive property or privilege is claimed are defined as follows:

1. A method to open a computer source file located on a remote computer, comprising the steps of:
(a) selecting, using a receiving computer, a source file located on a remote computer to open;
(b) examining an extension of the source file;
(c) determining a file transfer mode of the source file from the extension;

(d) sending a request to retrieve the source file;
(e) determining if the source file is binary;
(f) if the source file is determined to be binary, transferring the binary source file to a receiving computer; and
(g) opening the binary source file on the receiving computer.

2. The method of claim 1, further comprising:
(a) determining if the source file is text;
(b) if the source file is determined to be text, encoding the source file to be interpretable by the receiving computer;
(c) sending the encoded source file to the receiving computer; and
(d) opening the encoded source file on the receiving computer.

3. The method of claim 1, further comprising editing the binary source file.

4. The method of claim 2, wherein the step of encoding the source file further comprises determining the CCSID character set.

5. The method of claim 2, further comprising editing the encoded source file.

6. The method of claim 3, further comprising editing the binary source file with a LPEX editor.

7. The method of claim 5, further comprising editing the encoded source file with a LPEX editor.

8. The method of claim 5, wherein the encoded source file is a member in an iSeries native file system.

9. The method of claim 7, wherein the encoded source file is a member in an iSeries native file system.

10. The method of claim 5, further comprising editing with a default text editor.

11. The method of claim 3, further comprising editing with a default text editor provided by an integrated development environment.

12. The method of claim 5, further comprising editing with an operating system editor associated with the extension of the source file.

13. The method of claim 2, further comprising editing with an operating system editor associated with the extension of the source file.

14. The method of claim 3, further comprising:
(a) saving the edited source file to a temporary file on the receiving computer;
(b) determining the file transfer mode;
(c) reading the temporary file; and
(d) if the transfer mode is binary, transferring the edited binary source file to the remote computer.

15. The method of claim 5, further comprising:
(a) saving the edited source file to a temporary file on the receiving computer;
(b) determining if the file transfer mode is text;
(c) encoding the temporary file to to be interpretable by the remote computer;
(d) transferring the edited and encoded temporary file to the remote computer.

16. The method of claim 14, further comprising deleting the temporary file.

17. The method of claim 15, further comprising deleting the temporary file.

18. The method of claim 2, wherein the step of encoding further comprises encoding for the difference in an operating system on the remote computer and an operating system on the receiving computer.

19. The method of claim 3, wherein the step of encoding further comprising encoding for a difference in human languages between the source file on the remote computer and the encoded file on the receiving computer.

20. The method of claim 3, wherein the step of encoding further comprising encoding for a difference in computer languages between the source file on the remote computer and the encoded file on the receiving computer.

21. A method for editing a source file from a remote operating system with a receiving operating system, comprising the steps of:
(a) selecting a source file to open;
(b) examining an extension of the source file;
(c) determining a file transfer mode of the source file from the extension;
(d) sending a request to retrieve the source file;
(e) determining if the source file is binary;
(f) if the source file is determined to be binary, transferring the binary source file to a receiving computer;
(g) opening the binary source file;
(h) determining if the source file is text;
(i) if the source file is determined to the text, encoding the source file to be interpretable by the receiving computer;
(j) determining a CCSID character of the text source file and including the CCSID character in the step of encoding the source file;
(k) sending an encoded source file to the receiving computer; and
(l) opening the encoded source file
(m) creating a edited temporary file by editing the binary source file or the encoded source file with at least one of the following editors:
(i) a LPEX editor,
(ii) a default text editor provided by an integrated development environment, and/or
(iii) an operating system editor associated with the extension of the source file;
(n) saving the edited temporary file;
(o) determining the file transfer mode of the edited temporary file;
(p) reading the edited temporary file; and
(q) if the transfer mode is binary, transferring the edited temporary file to the remote computer;
(r) if the transfer mode is text, encoding the edited temporary file to encoding of the remote computer;
(s) transferring the edited temporary file to the remote computer, and
(t) deleting the edited temporary file on the receiving computer.

22. A computer processing device, comprising:
(a) a processor;
(b) a memory functionally connected to the processor, the memory having an operating system executing on the processor;
(c) a network interface by which the processor can access one or more remote systems across a connected or wireless network;
(d) an integrated development environment executing on the processor;
(e) an encoder by which to determine if a source file on the one or more remote systems is a binary or a text file and if a text file to encode the differences between the one or more remote systems and the operating system;
(f) a datastore technology by which to transfer the source file from the one or more remote systems to the operating system; and
(g) an editor by which to edit the source file on the operating system.

23. The computer processing device of claim 22, wherein the encoder encodes the differences between the operating system of the remote system and the operating system.

24. The computer processing device of claim 22, wherein the encoder encodes the differences between human languages on remote system so that the source file is translated for the editor on the operating system.

25. The computer processing device of claim 22, wherein the encoder encodes the differences between computer programming languages on remote system so that the source file is translated for the editor on the operating system.

26. The computer processing device of claim 22, wherein the operating system of the remote system is a OS/400.

27. The computer processing device of claim 22, wherein the integrated development environment is Eclipse.

28. A computer processing device, comprising:
 (a) a processor connected to a memory;
 (b) a first operating system residing in memory and executing on the processor;
 (c) an integrated development environment residing in memory and executing on the processor;
 (d) a network interface by which the processor can access a connected or wireless network;
 (e) a datastore technology by which the integrated development environment can access and transfer a plurality of files between the one or more remote systems and the operating system;
 (f) an encoder by which to determine if one of the plurality of files is a source file on the one or more remote systems is a binary or a text file and to encode the differences between the one or more remote systems and the operating system such that the differences may be one or more of the following: operating system, human language, computer programming language;
 (g) an editor by which to edit the source file on the operating system; and
 (h) a temporary file on the operating system to store the edited source file;
 the encoder and the datastore technology to encode the edited source file for the remote system and to transfer the edited source file to the remote system, respectively.

29. An article of manufacture, comprising a data storage medium tangibly embodying a program of machine readable instructions executable by an electronic processing apparatus to perform method steps for operating an electronic processing apparatus, said method steps comprising the steps of:
 (a) requesting a source file on a remote system;
 (b) determining whether the source file is a binary or a text file;
 (c) encoding the text file for use on a local integrated development environment;
 (d) editing the source file within the local integrated development environment, whether it be a binary or a text file;
 (e) encoding the edited text file for transfer to the remote system.

30. The article of manufacture of claim 29, wherein the method steps may further comprise transferring the source file to the local integrated development environment and then transferring the edited source file to the remote system.

31. A file retrieval and editing system, comprising:
 (a) means to determine if a source file is a text or a binary file, the source file located on a remote computer system across a network;
 (b) means to encode a difference between the source file and a temporary file, the temporary file to be opened in a the file retrieval and editing system;
 (c) means to open the temporary file in the file retrieval and editing system;
 (d) means to edit the temporary file;
 (e) means to store the edited temporary file in the file retrieval and editing system;
 (f) means to encode the edited temporary file for use on the remote computer system; and
 (g) means to transfer the encoded and edited temporary file to the remote computer system.

* * * * *